Jan. 12, 1971  R. F. MOORE ET AL  3,553,922
GLUED-LAMINAE PILE

Filed April 22, 1968  2 Sheets-Sheet 1

R. FRED MOORE
AND
ALVIN E. MOORE,
INVENTORS.

BY
*Alvin E. Moore,*
ATTORNEY.

Jan. 12, 1971   R. F. MOORE ET AL   3,553,922
GLUED-LAMINAE PILE

Filed April 22, 1968   2 Sheets-Sheet 2

R. FRED MOORE
AND
ALVIN E. MOORE,
INVENTORS.

BY
Alvin E. Moore,
ATTORNEY.

United States Patent Office 3,553,922
Patented Jan. 12, 1971

3,553,922
GLUED-LAMINAE PILE
Robert Fred Moore, 1625 3rd Ave., Picayune, Miss.
39446, and Alvin Edward Moore, 916 Beach Blvd.,
Waveland, Miss. 39576
Filed Apr. 22, 1968, Ser. No. 723,213
Int. Cl. E02d 5/02; E04c 1/10
U.S. Cl. 52—595                        2 Claims

ABSTRACT OF THE DISCLOSURE

A sheet pile, preferably of two-inch thick lumber, made by gluing faces of the planks and clamping them in tight, unwarped face-to-face relation until the glue sets. The edges of the planks, at times uneven, are not glued to other plank edges; and the wide portions of the planks, even if previously warped, are forced by the clamping and gluing to remain in flatwise, strongly bonded arrangement. The invention also includes: ways of reinforcing the middle, tongue, and groove pile portions; means for interlocking piles together when they are in use; and a method of making the piles in a clamping fixture.

---

This invention pertains to a sheet pile comprising wooden laminae that are glued together.

Although sheet piles made up of planks that are fastened together have been known for generations they are still complicatedly and expensively built, may be forced or warped out of shape, and have leakage between the boards of each pile and between piles. Moreover, the present type of assembly of the planks in the common sheet pile—with unsealed joints along the board edges and overlapping layers of planks bolted together—is made in an expensive and inefficient manner.

Accordingly, one of the objects of the present invention is to provide a sheet pile that is simply made of planks that are strongly glued together in face-to-face relationship, with the planks being sufficiently wide (and presenting edges in opposition to sidewise forces on the pile) to provide great strength against bending or other movement of the pile under those forces.

Another purpose of the invention is to present such a pile in which the faces of the planks are sealingly secured together with waterproof glue that sets while the boards are strongly clamped together, and in which the board faces are not warped apart from each other, because they swell or shrink with approximately equal expansion or contraction.

Another object is to provide such a pile of rough, undressed planks, having their faces clamped and glued together and uneven edges free of contact with each other.

A further object is to construct sheet piles of glued boards which are reinforced by halves of poles that are substantially semicircular in cross section and have flat faces that are secured to sides of the piles.

A further purpose is to provide a pile of this type in which the poles are surplus cylindrical cores of logs from which veneer has been cut.

Another objective is to provide a pile comprising such half-poles and waterproof glue between their flat faces and the boards.

Another purpose is to present a pile comprising such half-poles, in which the boards are of approximately equal widths and are glued together only at their faces.

A further object is to provide a sheet pile the major part of which comprises boards of relatively narrow widths, and a minor portion of which comprises boards of wider widths, that provide reinforcing strength, all of these planks being contiguous and glued together only at their faces.

Another object is to present a sheet pile of a plurality of planks, all of which are in face-to-face assembly and have faces that are glued together, some of the boards being of different widths than others and forming a tongue and a groove for connection with other piles.

A further objective is to provide piles as set forth in the last paragraph, in which the tongues and grooves provide interlocking portions which secure the piles together.

Some other objects are to provide: a sheet pile of planks in face-to-face assembly that has separate elements secured to its side edges for interlocking and reinforcing adjacent edges of assembled piles; a sheet pile of this type in which the interlocking elements are of metal; a pile of this type in which one of the interlocking elements, comprising a groove-fitting tongue, is of plastic reinforced with fibrous material—for example, with fabric or fibers of fiber glass or nylon; and a method of assembling and gluing pile planks in face-to-face relationship.

The foregoing and other purposes of the invention will become more fully apparent from the following description of several forms of the invention and the accompanying drawings.

Each of the disclosed forms of the invented pile comprises planks, preferably at least two inches thick, and optionally of rough, unplaned lumber, that are securely joined together in face-to-face relation, preferably by means of strong, waterproof glue—for example by epoxy-resin cement. Although these planks may be of rot-resistant material such as cypress, cedar or redwood, they preferably are of wood that is abundant and relatively inexpensive, such as pine, and are treated with wood preservative by any known method of wood preservation. This treatment is optionally done after the planks are glued together, or else before they are assembled in the pile.

Each of the forms of the invented pile further comprises tongue-and-groove pile-interconnecting means. In the invention forms of FIGS. 1, 2, 3 and 5 this means is not of the securely interlocking type; and one corner of the bottom of each of the piles that is driven alongside another is preferably cut away or beveled as indicated at 2, so that the groove 3 of the pile that is being driven is forced against the tongue portion 4 of the adjacent pile that has been previously driven. In the invention forms of FIGS. 4 and 6 to 17 this pile-interconnecting means is of the type which securely interlocks each pair of piles by means of contacting, mutually holding flanged portions; and the bevel 2 is therefore not necessary. FIGS. 6 to 15 further show bracing means for weaker parts of the pile which in each instance optionally may be made of metal or of plastic reinforced with fibrous material, for example fabric or fibers of nylon or fiberglass.

Figure 1:
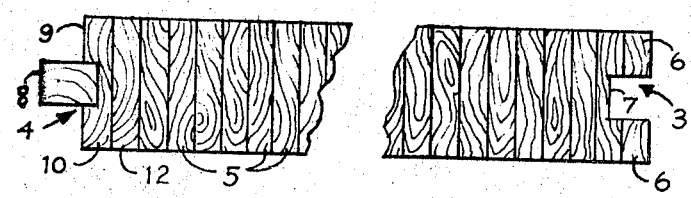
FIG. 1 is a plan view of an invented pile, broken away in its middle part.

In FIG. 1 the planks 5 having faces that are strongly glued together are of sufficient width to prevent buckling of the pile under the side forces to which it is normally subjected. These boards 5, which optionally may be made of either planed or rough-sawed lumber, are clamped and glued together (preferably with the use of epoxy-resin cement) only along their faces. Sometimes these planks are warped or slightly uneven along their faces; but due to the fact that their thickness, exposed to the force of the clamping means, is two inches (or at most three inches) they are easily clamped into close juxtaposition, by the use of clamps or strong nails, after glue is applied to them. Thereafter the interior of the pile is very strong and well-sealed. This is in contrast to the expensive, usually bolted asesmbly of presently common sheet piles, in which overlapped boards are placed alongside each other in edge-to-edge arangement, and are prone to weakness, leaking and rot between them.

In the forms of the invention shown in FIGS. 1, 4, 6, 9, 10, 11 and 13, the planks in a pile, excepting those which form parts of the tongue-and-groove connections, are of the same width, which in most installations is preferably six or eight inches. These piles thus have no thicker, reinforcing portions. But in FIGS. 2, 3, 5, 12 and 14 to 17 piles are illustrated which comprise such pile-reinforcing portions at their tongue-and-groove connections and in their middle parts. The major portion of each of these reinforced piles preferably is made up of planks that are four or six inches wide and the minor, reinforcing portion preferably comprises boards that are in the width range of six to twelve inches.

Figure 6:
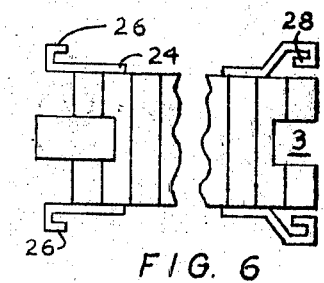
FIG. 6 is a plan view, partly broken away, of a pile similar to that of FIG. 1, provided with pile-interlocking elements.

The tongue-and-groove connections optionally may be any of the various illustrated types. In FIGS. 1 and 6 the groove 3 is formed between two boards 6 that are narrower than the other boards, and preferably also comprises a cutaway portion 7 that is formed in one of the planks. And the tongue portion 4 comprises a tongue 8 that is clamped and glued between narrow-width boards 9 and 10, and preferably also is clamped and glued in a cutaway portion of plank 12. Optionally, the clamping and gluing of the groove and tongue portions 3 and 4 is done in two separate operations before they are clamped and glued to the remainder of the pile.

Figure 2:
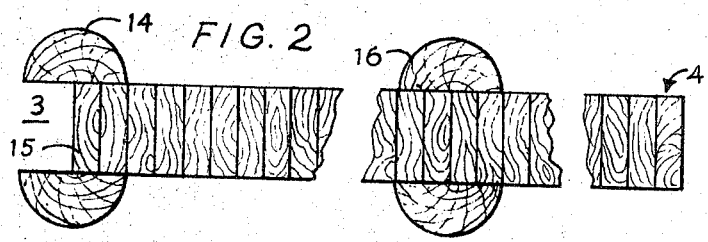
FIG. 2 is a plan view, partly broken away, of a second form of the invention.
Figure 3:
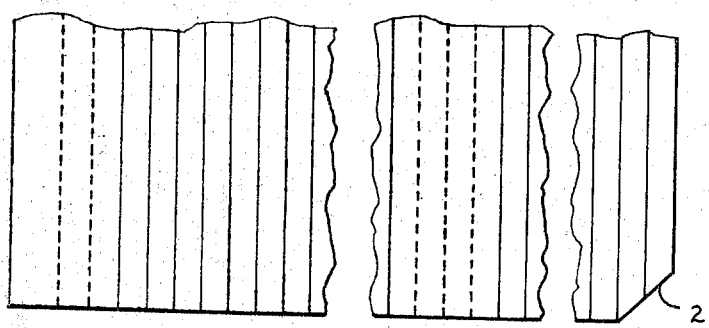
FIG. 3 is a side elevational view, partly broken away, of the pile of FIG. 2.
Figure 5:
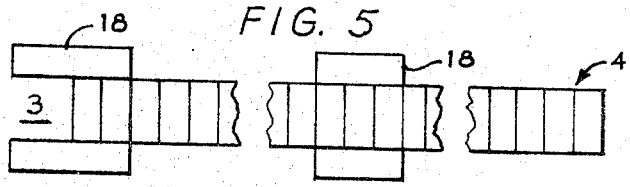
FIG. 5 is a plan view, partly broken away, of a pile similar to that of FIG. 2, but comprising planks instead of half-poles for pile-interconnecting and reinforcing elements.

In FIGS. 2, 3 and 5 the grooved portion 3 is a thicker joint-reinforcing part. In FIG. 2 this comprises longitudinally sawed halves of poles. Preferably, these poles are cylindrical, and are cores that are left after cutting veneer from longs. These cores have little use at present and thus are relatively inexpensive. They are usually eight to twelve feet in length; and if a sheet pile of this invention is longer than the cores two or more of the half-cylindrical pieces 14 are clamped and glued in end-to-end juxtaposition and to a pair of planks 15.

Optionally, there is provided a middle pile-reinforcing part which comprises half-cylindrical pieces 16 of poles or veneer cores (that optionally are in end-to-end arrangement), clamped and glued to the edges of four of the planks. Optionally the portions of this pile of FIG. 2 that comprise the pole or core halves 14 and 16 and certain ones of the planks are clamped and glued together before they are glued to the remainder of the pile.

In the pile of FIG. 5 (made in the general manner of that of FIG. 2) the thicker grooved portion and the optional middle-reinforcing part comprise sawed planks 18.

Figure 4:
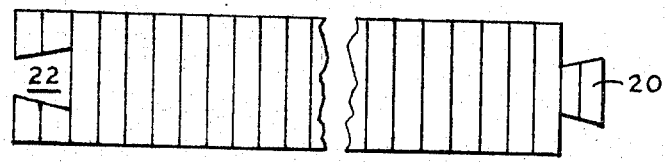
FIG. 4 is a plan view, partly broken away, of a third form of the invented pile.

In FIGS. 4 and 6 to 17 various optional types of tongue-and-groove connections that comprise pile-interlocking flanges are shown. In FIG. 4 the flanged, interlocking feature comprises interfitting, flaring surfaces of the dovetailed tongue 20 and groove 22. These tongue and groove parts are made of planks that are joined in face-to-face assembly, and optionally may be separately glued and clamped (for example, by nails, bolts or clamps) and glued; or they may be glued to the other planks of the pile in a single operation, according to the method illustrated in FIGS. 16 and 17. The pile of FIG. 6 is similar to that of FIG. 1, but its tongue-and-groove connection comprises interfitting and interlocking elements, extending from the top to the bottom of the pile, made of material that optionally may be metal (for example, steel or aluminum alloy) or plastic, reinforced with fibrous material (for example, nylon or fiber glass fabric or fibers). Thes elements comprise pile-attached flanges 24 which are fastened ot opposite edges of certain planks and hooked interlocking flanges 26 and 28. Each of the pair of outer hooked flanges 28 is located farther from a plank edge than the inner hooked flange 26 which in the pile-driven joint fits within it.

Figure 7:
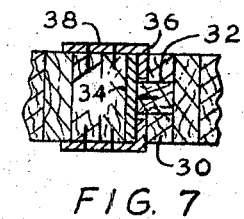
FIG. 7 is a detailed, sectional view of interlocked portions of two assembled piles.
Figure 8:
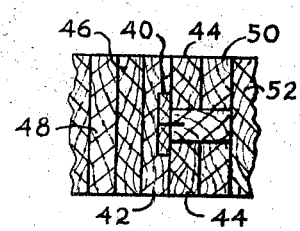
FIG. 8 is a detailed, sectional view, similar to FIG. 7, showing another type of pile-interlocking means.
Figure 9:
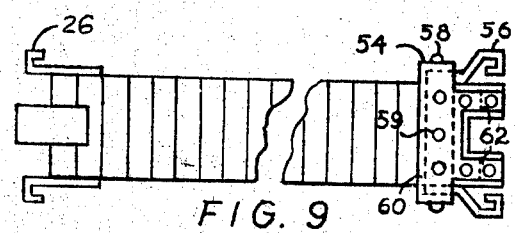
FIG. 9 is a plan view, partly broken away, showing the pile of FIG. 1, provided with pile-interlocking and joint-bracing means.
Figure 10:
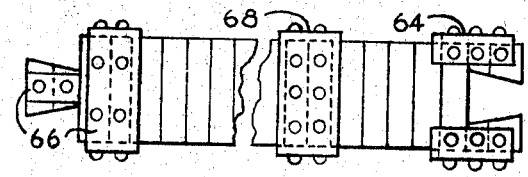
FIG. 10 is a plan view, partly broken away, showing the pile of FIG. 4, provided with pile-interlocking and bracing means.
Figure 11:
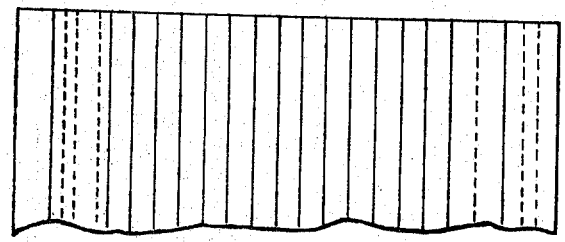
FIG. 11 is a view in side elevation, partly broken away, of the pile of FIG. 9.

FIG. 7 shows a joint between two piles which may be of the type shown in FIG. 1 or, optionally, of mostly narrow planks with a thicker, reinforced middle portion. One of these piles comprises a pair of narrow, tongue portion pile-edge planks 30, a tongue portion 32 which is similar to but narrower than tongue 8 of FIG. 1, and a metal or fibrous-material-and-plastic locking bar 34 that extends from top to bottom of the pile and has a space between it and the unglued faces of boards 30. Into this space, when the adjacent pile is driven, fits the inwardly extending pair of interlocking flanges 36 of a pair of angle irons (or angles of aluminum alloy or nylon-reinforced plastic), 38, which are fastened to pile planks, and preferably extend from top to bottom of the pile. The joint of FIG. 8 is similar to that of FIG. 7, but instead of the angle elements 36 and 38 the locking bar 40, of wood (or metal or reinforced plastic) fits in a recess between a cutaway part of the pile groove portion of plank 42 and faces of narrow planks 44, having a width narrower than planks of the pile middle portion. In FIG. 8, the left-hand pile comprises planks 42, 44, 46 and 48, and the right-hand pile comprises planks 50 and 52 and the locking bar 40. FIGS. 9 and 11 show a pile and pile-interlocking elements 26 and 56 of the type of FIG. 6; but they further show a joint-bracing element of metal (or reinforced plastic) which comprises short vertical flanges 54 that are fastened to locking elements 56 and to edges of the planks by screws or spikes 58 and a horizontal plate 60 (fastened by screws or spikes 59) which has outwardly extending fingers 62 that brace the weaker, joint part of the pile. A similar brace is also located at the bottom of this pile. The pile of FIG. 10, similar to that of FIG. 9, has at each of its vertically spaced ends two angled elements 64 (of metal or plastic, reinforced with fibers or fabric) that brace the pile groove portion and two similar members 66 and 68 that brace the tongue and middle portions of the pile.

Figure 12:
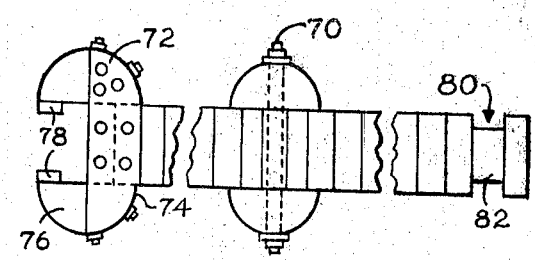
FIG. 12 is a plan view of a fourth form of the invented pile, having semicylindrical reinforcing and groove-forming means.

FIG. 12 shows a pile that is similar to that of FIG. 2; but its middle, reinforcing part comprises half-poles that are fastened to the planks by both glue and bolts 70, and its grooved part includes at each of its vertically-spaced ends a brace 72, having vertical, curved flanges 74 that are screwed or spiked to the curved parts of half-poles 76. This pile also comprises pile-interlocking elongated bars 78 that fit and interlock with recesses 80 that are bounded by edges of the narrow plank 82.

Figure 13:
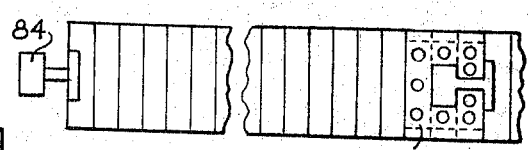
FIG. 13 is a plan view, partly broken away, of a pair of interlocked piles.
Figure 14:
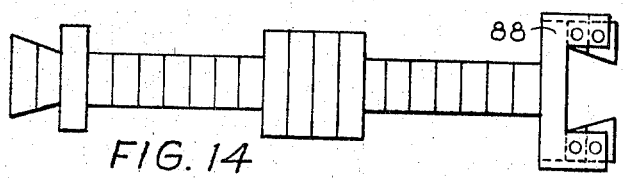
FIG. 14 is a plan view of a fifth form of the invented pile, which is similar to but mostly narrower than that of FIG. 10, and includes wooden reinforcing portions.
Figure 15:
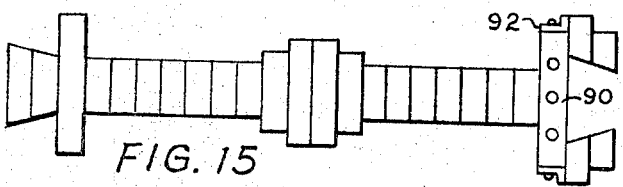
FIG. 15 is a plan view of a pile that is similar to that of FIG. 14 but comprises different types of pile-reinforcing means.

The pile of FIG. 13 is similar to those of FIG. 8; its pile-interlocking members comprise a metal or fibrous-material-and-plastic tongue 84 that fits within a plank-bounded recess. The joint at this recess is strengthened by braces 86 at the top and bottom of the pile.

FIGS. 14 to 17 illustrate piles that are almost entirely composed of planks of substantially uniform thickness that have their faces glued together. In each of these piles some of the planks of the tongue and groove portions and all of those in the middle portion of the pile are wider than the other planks. The pile of FIG. 14 comprises a pair of vertically spaced braces 88; and the pile of FIG. 15 comprises, at each of its vertically spaced (top and bottom) ends, a horizontal brace plate 90, and on each of its sides a long bracing angle 92 of metal or fibrous-material-and-plastic, extending from top to bottom of the pile.

Figure 16:
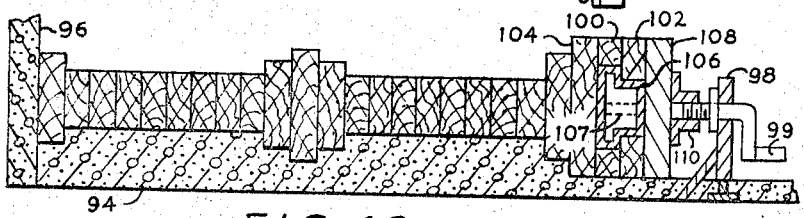
FIG. 16 is a view in vertical cross section through the middle parts of horizontally laid pile planks that are being held in assembled relation and glued in accordance with a method of pile manufacture which is part of this invention.
Figure 17:
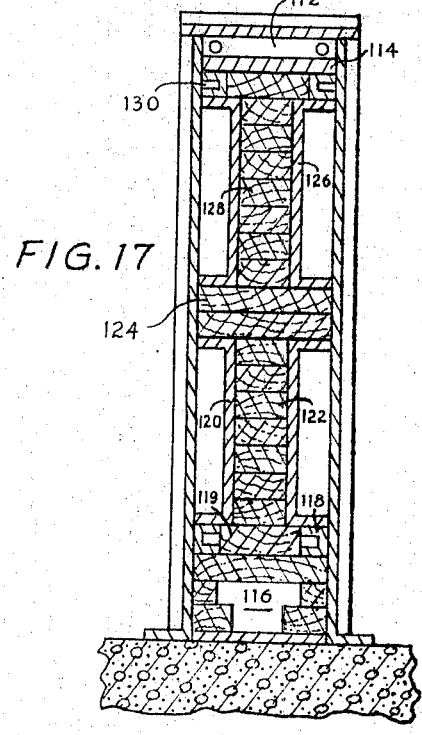
FIG. 17 is a view in cross section of vertically stacked planks of a pile that is being made in a vertical fixture according to the invented method.

FIGS. 16 and 17 show piles that are being made according to a method of this invention in two examples of apparatus that may be used in the process. The jig or fixture of FIG. 16 has a long, horizontal, trough-like, plank-holding device which comprises a base 94, that may be of metal, but preferably, as shown, is of concrete, and two side walls 96 and 98 that are fixed to the base. Both of these walls may be of either metal or concrete, but as shown 98 is a metal bar and 96 is a building wall. The upper part of the base 94 is shaped to conform with the lower configuration of the particular pile that is made. If this pile were of the type of FIG. 1, for example, the upper surface of 94 would be flat. But the pile that is illustrated in FIG. 16 has a thick, reinforcing middle part, thick tongue portion and a wide groove designed to interlock with the tongue. The recesses in 94 that conform to these thick portions are a little wider than the widths of the planks to be in them, so that when the handle 99 is turned to clamp the planks together the wider boards are definitely jammed against each other.

To prevent the narrow planks 100 and 102 from falling before the glue on them sets they (as well as the two lower narrow planks) may be nailed and glued to plank 104 in a separate fixture before placing the six planks of the groove part in the jig of FIG. 16. But the preferred method of making the pile includes use of a hollow, narrow-board-spacing shell 106, made of smooth metal or plastic, reinforced with fibers or fabric. In use, this shell (as well as the upper surface of base 94) is preferably coated with oil or other material which prevents the epoxy-resin glue from sticking to it. For removal of the blank-positioning element after the glue is set a handle 107 is fastened on one of the ends which close its hollow space.

The method of making the pile in this apparatus comprises the following steps:

(1) Providing sufficient clearance for easy face-to-face assembly of substantially uniformly-thick pile planks in a jig or fixture by reciprocating the elongated bar 108 toward a fixed part of the jig (by rotating the screw in the nut or gear 110 that is fixed to 108); this may be done by manually or electromotively turning the handle 99 and the threaded shaft;

(2) Applying glue to the interengaging faces of the wider pile planks and laying them in face-to-face engagement within the fixture;

(3) Applying glue to and laying the narrow-width ones of the uniformly-thick pile planks in the fixture; and positioning them correctly in relation to the wider planks (by placing removable plank-spacing means 106 in the jig, within the outer borders of the desired pile);

(4) Forcibly reciprocating the pile-clamping element 108 against an outer plank of the pile, thus tightly jamming the glued faces together, and against a second fixed jig part;

(5) Allowing the glue to set;

(6) Reciprocating the pile-clamping element 108 away from the pile planks;

(7) Removing the plank-positioning means 106 from its position between portions of the pile; and (8) Removing the glued pile from the jig.

The jig or fixture of FIG. 17 differs from that of FIG. 16 in that it facilitates the vertical stacking of the glued pile planks, has somewhat different narrow-plank-positioning elements, and instead of the handle 99 has a hydraulic or pneumatic motor 112, which clamps the glued planks together by exerting valve-controllable force on the elongated bar or piston 114. This vertical stacking of the planks, which is economical in the utilization of factory space, is made feasible by the use of more narrow-plank-spacing elements than in the jig of FIG. 16.

The steps of the above-described basic method apply also to the use of the apparatus of FIG. 17. In this use a plank-spacing shell is not necessarily placed in the groove 116, for the narrow planks there may be positioned against the side walls or frame of the open-ended fixture. Eight removable plank-positioning elements, having handles similar to 107 on closed ends, are used. The first four that are inserted thru an open end of the jig are: the pair 118, which center the second-placed wider plank 119; and the pair 120, placed over plank 119 and shells 118, centering the narrow-planks 122. Over the shells 120 and planks 122 the wide, pile-reinforcing planks 124 are stacked, and over these the two shells 126 are placed, which center the planks 128 as they are shoved in place thru the open-ended fixture. After the two top shells 130 center the upper plank of the assembly, pressurized fluid is valve-admitted into the motor 112; and the piston-bar 114 (which has been temporarily held upward to provide plank clearance by means of a releasable catch or dog or by a vacuum in the motor) is forced downward, strongly clamping the glued faces of the planks together, and flattening out their warped portions.

Various changes in the specific illustrated structure may be made within the scope of the following claims.

We claim:
1. A tongue-and-groove sheet pile having:
   a middle portion, comprising: a plurality of planks, each of which has a width that is at least twice as wide as its thickness, said planks having faces in close juxtaposition and all their edges free of contact with the edges of other planks; and waterproof glue, bonding the juxtaposed pairs of said faces together;
   a pile groove portion, fixed to said middle portion, comprising: a plurality of pairs of closely-juxtaposed, groove-portion planks, having faces in close juxtaposition and all their edges free of contact with the edges of other planks; the planks of said groove portion that are nearest to said middle portion having faces that are in flatwise juxtaposition with the face of an adjacent plank of the middle portion; and waterproof glue, bonding together all of the said juxtaposed faces of the grooved portion; and
   a pile tongue portion, adapted to fit in the grooved portion of an adjacent pile, comprising: a plurality of planks, at least one of which is adapted to fit within the groove portion of an adjacent pile, and at least one of which has a face in flatwise juxtaposition with the face of an adjacent, outer plank of said middle portion; and waterproof glue, bonding said last-named juxtaposed faces and the faces of said last-named plurality of planks;
   the said pile groove and pile tongue portions compris- ing pile-interlocking elements extending exterior of planes along said middle portion edges.

2. A pile as set forth in claim 1, in which said interlocking elements are:

a pair of elongated, pile-groove-portion elements, comprising a pair of parallel pile-attached flanges, means fastening said pair of flanges to the plank part of the pile on opposite sides of the pile, and a pair of outer hooked flanges, each of which is rigidly connected to one of the pile-attached flanges; and a pair of elongated, pile-tongue-portion elements, comprising a pair of parallel pile-attached flanges, means fastening said last-named pair of flanges to the plank part of the pile on opposite sides of the pile and a pair of inner hooked flanges, each of which is rigidly connected to one of the last-named pile-attached flanges, and is adapted to fit within an outer hooked flange of an adjacent pile.

References Cited

UNITED STATES PATENTS

| | | | |
|---|---|---|---|
| 374,944 | 12/1887 | Delafield | 52—726X |
| 1,350,490 | 8/1920 | Dyer | 52—591 |
| 1,610,933 | 12/1926 | Daniels | 52—233 |
| 2,849,758 | 9/1958 | Plumley et al. | 52—595X |
| 1,988,201 | 1/1935 | Hall | 52—622X |
| 2,969,983 | 1/1961 | De Vore | 52—622X |
| 3,131,442 | 5/1964 | Persson-Melin | 52—622X |
| 3,152,568 | 10/1964 | Mayer | 52—582X |
| 3,304,674 | 2/1967 | Ward | 52—233 |
| 3,313,076 | 4/1967 | MacDowald | 52—309X |
| 3,343,321 | 9/1967 | Axelsson | 52—309X |
| 3,397,496 | 8/1968 | Sohns | 52—595X |
| 3,314,206 | 4/1967 | Daw | 52—415 |

FOREIGN PATENTS

| | | | |
|---|---|---|---|
| 141,663 | 2/1939 | Sweden | 52—591 |

HENRY C. SUTHERLAND, Primary Examiner

S. D. BURKE III, Assistant Examiner

U.S. Cl. X.R.

52—233, 530; 61—58